(12) United States Patent
Rigolet (10) Patent No.: US 8,566,782 B2
(45) Date of Patent: Oct. 22, 2013

(54) GENERATING APPLICATION DATA EDITORS

(75) Inventor: Jean-Yves Rigolet, Paris (FR)

(73) Assignee: International Business Machines Corporation, Armonk, NY (US)

(*) Notice: Subject to any disclaimer, the term of this patent is extended or adjusted under 35 U.S.C. 154(b) by 1400 days.

(21) Appl. No.: 12/298,110

(22) PCT Filed: Mar. 13, 2007

(86) PCT No.: PCT/EP2007/052350
§ 371 (c)(1),
(2), (4) Date: Oct. 22, 2008

(87) PCT Pub. No.: WO2007/124977
PCT Pub. Date: Nov. 8, 2007

(65) Prior Publication Data
US 2009/0089746 A1     Apr. 2, 2009

(30) Foreign Application Priority Data
Apr. 27, 2006 (EP) .................................. 06300414

(51) Int. Cl.
*G06F 9/44* (2006.01)
(52) U.S. Cl.
USPC ........... 717/104; 717/105; 717/106; 717/108; 717/109; 717/110
(58) Field of Classification Search
USPC .......... 717/104, 105, 106, 108, 109, 110, 113
See application file for complete search history.

(56) References Cited

U.S. PATENT DOCUMENTS

| 5,835,910 A | * | 11/1998 | Kavanagh et al. ..... 707/999.103 |
| 5,987,247 A | * | 11/1999 | Lau ............................. 717/100 |
| 2005/0273763 A1 | | 12/2005 | Bendsen et al. |

FOREIGN PATENT DOCUMENTS

| JP | 7110763 A | 4/1995 |
| JP | 10232769 A | 9/1998 |

OTHER PUBLICATIONS

"Custom Data Entry Form System for Software Applications", IBM Technical Disclosure Bulletin, IBM Corp. New York, US, vol. 34, No. 11, Apr. 1, 1992, pp. 384-385, XP000303300, ISSN: 0018-8689.

* cited by examiner

*Primary Examiner* — Qamrun Nahar
(74) *Attorney, Agent, or Firm* — Yee & Associates, P.C.; David A. Mims, Jr.

(57) ABSTRACT

A method, computer program product and system for generating an editor to be executed through a graphical user interface of a computer, for editing the persistent data of an application, the persistent data being described and stored in a data object model using a modeling language defining a hierarchical organization of classes, their attributes and the relations between classes, comprising retrieving the root class and starting from the root class, creating a page per class for creating the instances of the class. Each page of a current class comprises an Edit section for editing the attributes of the class, a Table section which lists all the instances of the class when they will be created and a hyperlink section for listing pointers to other pages corresponding to the target classes in relation with the current class.

8 Claims, 8 Drawing Sheets

GENERATING APPLICATION DATA EDITORS

CROSS REFERENCE TO RELATED APPLICATIONS

This application claims priority to PCT Application No. PCT/EP2007/052350 entitled "A METHOD AND SYSTEM FOR GENERATING APPLICATION DATA EDITORS", filed on Mar. 13, 2007, which is incorporated herein by reference and assigned to the assignee herein.

FIELD OF THE INVENTION

The present invention generally relates to development of User Interfaces of an application; more particularly, the invention relates to a generator of form editors created on the basis of an object model of the application data.

BACKGROUND

Part of the development cycle of a business application, the generation of editors is to provide to the end user a User Interface (UI) allowing the collection of data of the application. The UI code for an easy evolution and maintenance of that code is developed with an object-oriented technology.

Many tools exist which facilitate object oriented software engineering. Methodologies such as the Unified Modeling Language (UML) provide a graphical language to visualize and manage the development artifacts. Although these methodologies provide tools to generate code for the developer, it is generally a fine-grained code that does not encompass all the user application and editing capabilities. One prior art provides a solution for interactively generating an object oriented framework consisting of a tree view of the framework, a graph view of the objects, a method view of the methods and an edit view to modify the framework, objects and methods. Run time objects may be automatically generated but the developer does not have the option to customize this code generation by introducing specificity of the editing attributes according, for instance to the graphical capacities of the target operating system on which the generated code will be executed. Once the objects are created each editor code needs to be modified for customization.

The Eclipse® Modeling Framework (EMF) is a modeling framework and code generation facility for building tools and other applications based on a structured data model. From a model specification described in XMI (XML Metadata Interchange) format, EMF provides tools and runtime support to produce a set of Java classes for the model, a set of adapter classes that enable viewing and command-based editing of the model, and a basic editor. The editor can be customized by introducing some specificity of the editing attributes, however, the editor is basic and generic. It represents a tree and lists the attributes for each node of the tree. The editors generated with EMF can thus be used for development and test purposes but not for an execution in the real business environment which requires covering more detailed data update under the data model.

Object, View, and Interaction Design (OVID) is a software design method which can be translated into code design. It starts from an object model of the persistent data of the application written in UML and results into generation of code for the editors. The editor interface can be customized during the phase of definition by introducing some specificity of the editing attributes. However, with OVID, the developer has to modify the model, to adapt it by entering specificities of the target user interface. This is intrusive and forces the modeler to define UI specifications in the UML model to produce editors. The modeler has to produce as many models as the target requires for the execution of editors.

SUMMARY

It is therefore an object of the present invention to provide a method for generating data editors starting from a data model and adapted for use in the execution environment, achieved using a method, computer program product and system for generating an editor to be executed through a graphical user interface of a computer, for editing the persistent data of an application, said persistent data being described and stored in a data object model using a modeling language defining a hierarchical organization of classes, their attributes and the relations between classes, said method comprising the steps of retrieving the root class and starting from the root class, creating a page per class for creating and updating the instances of the class. Each page of a current class comprises an Edit section for editing the attributes of the class, a Table section which lists all the instances of the class when they will be created and an Hyperlink section for listing pointers to the other pages corresponding to the target classes in relation with the current class.

The user of the editor, navigating in the pages with the use of the Hyperlink section pointers, will be able to instantiate all the classes of the model. In one embodiment of the editor, tabs are added in the lower portion of the screen pointing to the pages of the other classes of the model. In one other embodiment, a unique page is created for all the classes belonging to a same abstract page, the Edit section containing the attributes grouped by the different ancestors of the current page. In another embodiment, the ancestors of the current class are found in the meta model and in the Edit section are displayed the fields for editing the attributes grouped by ancestors of the current class.

Advantageously, an embodiment of the invention generates editors without any modification of the original data model. The user interface of the editor can be customized during the editor generation phase without requiring any change of the data model. A consequence is that the model designers do not have to be involved in the phase of editor generation which would be the responsibility of other developers or testers of an application development group.

The customization of the user interface of the editor is done during editor code generation by providing to the developer interfaces which, in a preferred embodiment, are graphical user interfaces corresponding to hooks in the generator to modify the code of page building. This avoids directly modifying the code once generated as performed by the prior art.

In one embodiment, the editor generated covers all the components of the complete data model of the application in a set of pages. In a preferred embodiment, the generated multi-page editors, one page per object, starts with displaying an overview page in order to give the end-user a complete view of the edited root (or main, central) object. In one page the user can update the class attributes for the given class and the classes higher in the class hierarchy which are editable in the edit section. The relation instances are listed in the table section and the user can point to the target class of a relation instance using the Hyperlink section.

With the editor generated, the number of pages is optionally reduced by grouping the class pages belonging to a same abstract class.

DETAILED DESCRIPTION

Figure 1:
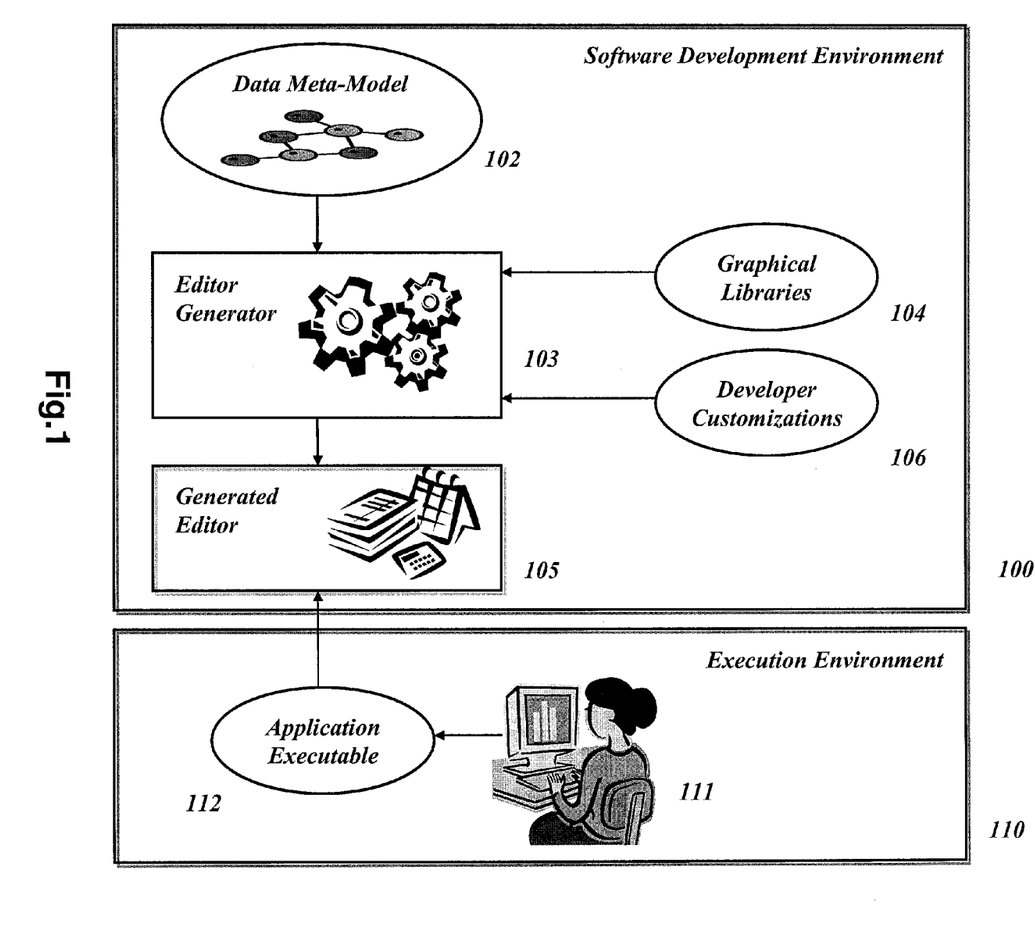
FIG. 1 illustrates an environment for constructing and using application editors produced according to a preferred embodiment.

FIG. 1 illustrates an environment for constructing and using the application editors produced according to a sample embodiment of the invention. An editor for the persistent data of the application, forming the data meta-model, is generated in this environment.

In a preferred embodiment, the invention is implemented as a software program executing on a computer system, the Editor Generator (103) executing on the computer system. Other possible implementations for creating editor source code are also suitable within the scope of the present invention.

The Editor Generator (103) allows the application developer to generate the code of a fully-usable rich application editor (105) which may be combined with an application executable (112) to provide a user (111) the means to create, read, update and delete application data and attributes.

In a sample embodiment, the Editor Generator (103) is running in the 'Software Development Environment' (100) and creates the code of the data editors. The editors are then executed in the 'Execution Environment' (110). The 'Execution Environment' may be a test environment of the application for which the persistent data of the data model will be edited. In this case, the executing environment is the development environment and the Editor Generator and the editor can be executed on the same computer system by the developers. The Execution Environment can also be the target application business environment, in which case the Editor Generator is still executed by the developer and the Editor is executed by the application end user.

The Software Development Environment (100) is a development framework with some components as many exist today which comprises tools such as editors, compilers, and linkers available in the developer computer workspace to build the entire application. The software environment is installed as programs operating on an Operating System providing a graphical user interface used as the favorite developer interface of a preferred embodiment of the invention.

One core unit, the generator (103) needs a set of information as program input. The first input is the data meta-model (102) representing the data to be manipulated by the application described in a design language which can have graphical representation such as UML in a preferred embodiment. The Editor Generator (103) also accesses a set of graphical libraries (104) in relation with the UI graphical capabilities in the development environment compatible with the execution environment (110). The generator during generation process relies on this set of graphical libraries.

Amongst other capabilities and in order to provide flexibility to the developer, the generator can integrate graphical customizations (106) of the editor provided by the developer. These customizations allow the developer to force specific graphical look and feel requirements of the generated application editor. These customizations are compatible with the Graphical Libraries (104) of the development environment, and will be applied when running the editor in the execution environment.

Figure 2:
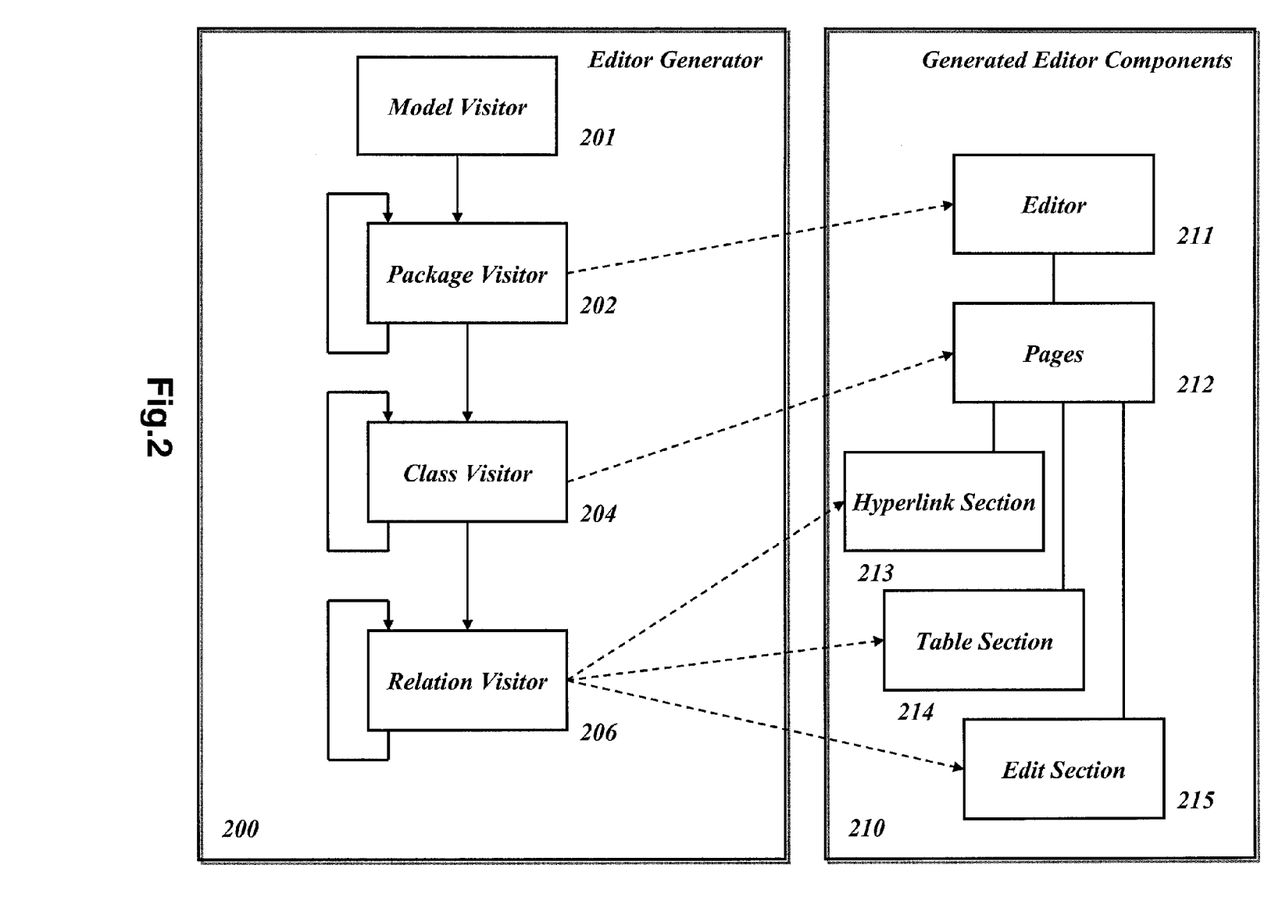
FIG. 2 shows the high-level components of the generator and the generated editor according to a sample embodiment of the invention.

FIG. 2 shows details of the high-level components involved in a preferred embodiment of the invention. FIG. 2 illustrates the logical content of an application editor generator (200) used during the generation process and the relation with the resulting components defining the generated application editor (210).

The editor generator (200) contains four main components, the Model Visitor (201), the Package Visitor (202), the Class Visitor (204) and the Relation Visitor (206). The generator process starts with a developer request and launches the editor generator (200) using as a main input the data meta-model (102) defined by the application designer.

The generator process starts by inspecting the selected data meta-model, first with a visit to the model definition itself, using the Model Visitor (201). In a preferred embodiment, the model is designed using UML in which related elements are grouped together under 'packages'. During this inspection, the generator retrieves all the packages contained within it. Making a loop on all the contained packages, the editor generation process then loops on all the packages, using the Package Visitor (202) looking for all the classes contained within each package retrieved. The generation process continues inspecting the data meta-model content now looking for all the relations defined for the currently inspected class, using the Relation Visitor (206).

During the data meta-model inspection, the editor generation process produces language-aware executable editor components (210) of three main types, the editor (211), pages (212) and sections (213, 214, 215).

The generated components relationships are as follows: an editor (211) contains pages (212), which contain sections (213, 214, 215). Each page corresponding to one object, the sections of a page can be of three types, the Hyperlink Section (213), the Table Section (214) and the Edit Section (215). The Table Section (214) provides the list of the relation instances of the object with other objects according to the meta-model. The Hyperlink Section (213) provides a list of links to allow the end-user to point to other object instances with which the origin object is in relation in the model. In the Edit Section (215) the editable fields in the model are displayed.

Figure 3:
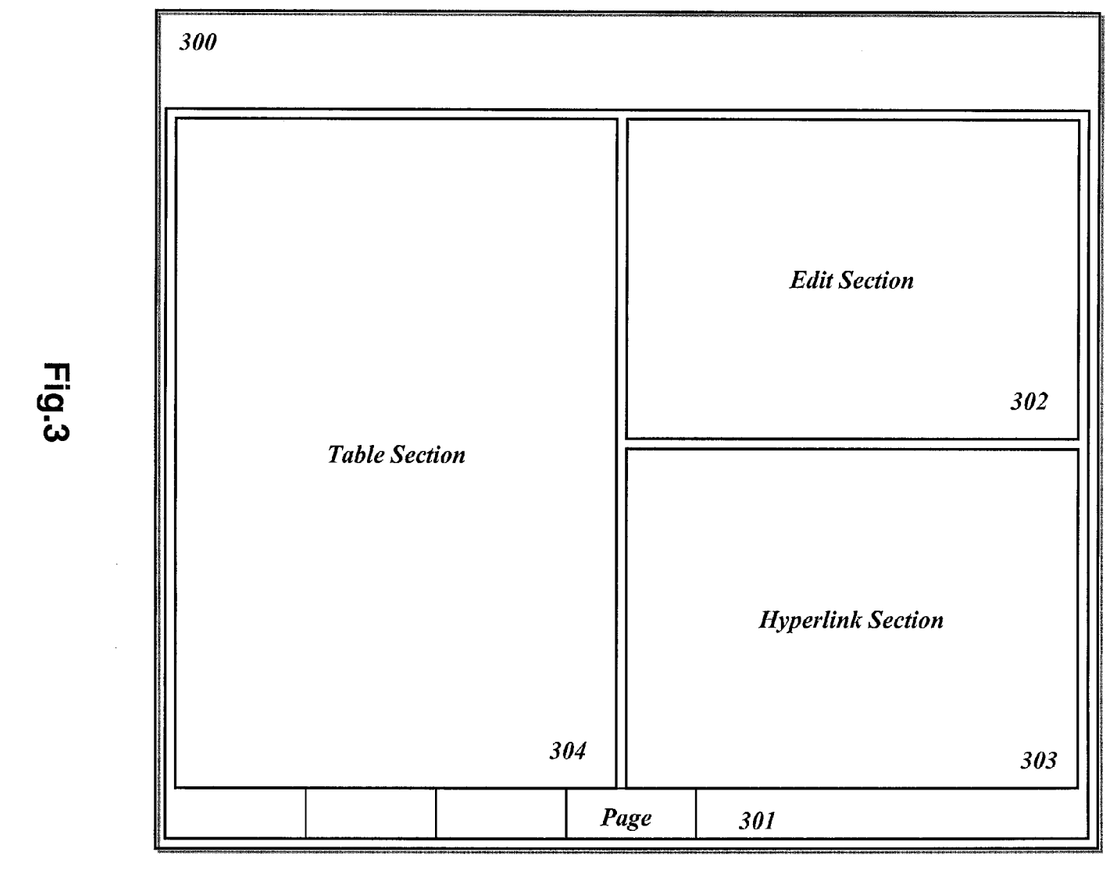
FIG. 3 illustrates the layout details and composition of a page of the generated application editor (300) as implemented with using a preferred embodiment of the invention.

FIG. 3 shows the layout details and composition (300) of a page of the generated application editor as implemented in a preferred embodiment.

In the generated editor there is one editable page per class. A page will be used by the end user of the generated editor to create all the instances of the class. A standard page displayed by the generated editor reflects the navigation inside the object model for editing all the instances of all the classes of all the editable data of the application. The standard page displayed by the generated editor of a preferred embodiment comprises three editable sections which are an Edit Section (302) on the top-right side of the page, a Table Section (304) on the left side, an and an Hyperlink Section (303) on the bottom-right side. A bottom line of tabs allows jumping to other pages, that is, to the other classes for further editing of their corresponding instances.

In the sample embodiment, in the page of a class, the Edit section (302) displays the class and the attributes of the class. If the class is not the first in the class hierarchy, the classes of the higher hierarchy are also listed in the Edit section. The Table section (304) will contain a list of all the instances the end user will create when editing the page of the corresponding class. The Hyperlink section (303) contains pointers to the page of a target class in relation with the class for which the page is created.

Consequently, from such a page for one class, the end user can jump to all the instances of the class by clicking on the rows of the Table section. The end user can also jump to the instances of all the target classes in relation with the class corresponding to the page.

When executed, the generated editor displays a first page, a page of overview. The bottom row of the page contains tabs (301) allowing the user to select the other class page of the editor. From this overview page, the end-user has a complete view of the classes. Every single page displayed by the generated editor (300) is available for selection and displays its content according to the current page selection.

Figure 4:
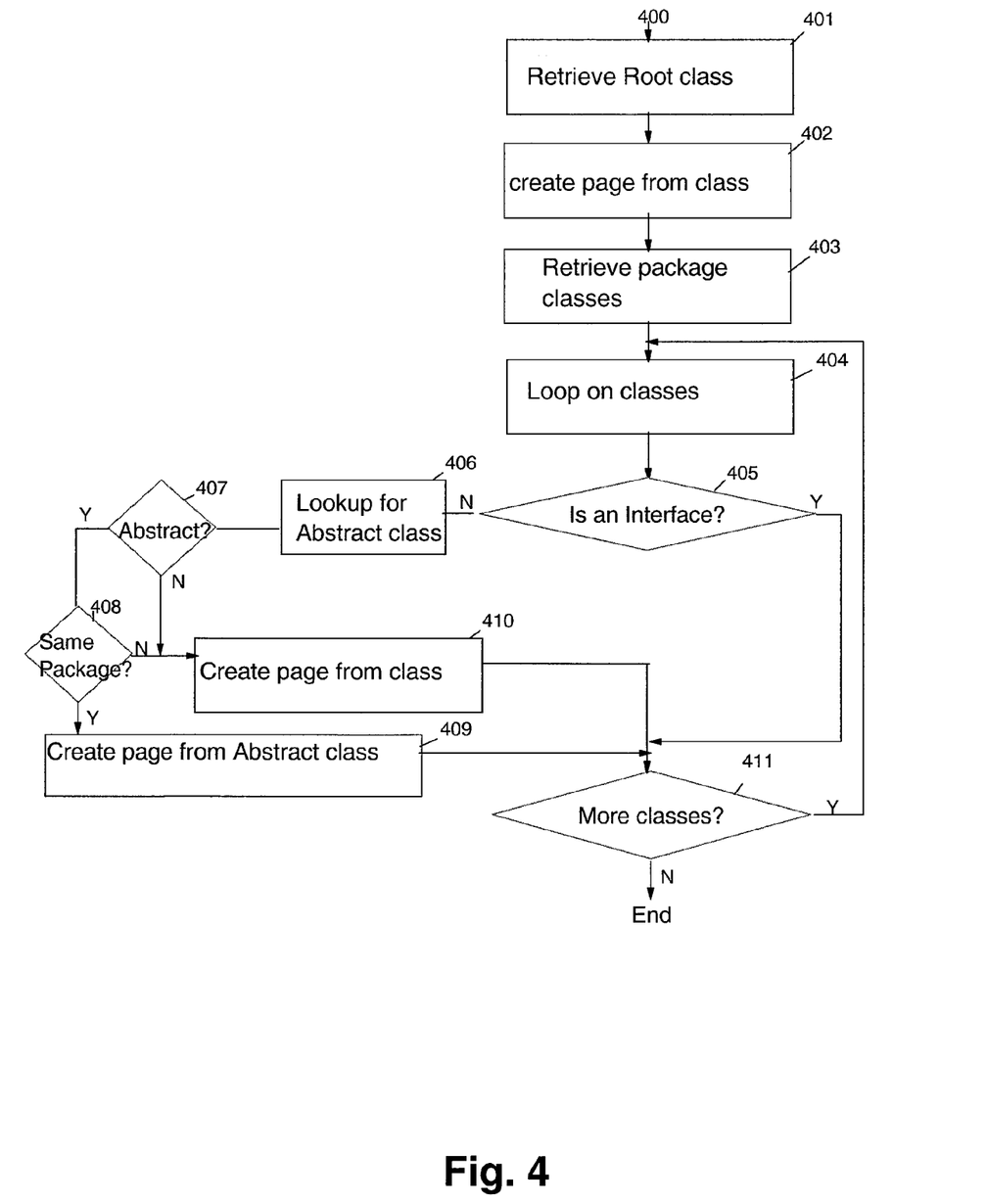
FIG. 4 is a flowchart of a method for generating the pages of the application editor according to a preferred embodiment of the invention.

In order to fit every graphical look and feel an end-user may need, all the standard places of the section can be modified either during the editor generation process using the customizations or later, directly in the generated code FIG. 4 illustrates a flowchart of a method for generating (400) the Pages of the application Editor (210) during the generation process (103). This flowchart is implemented in the Class Visitor component (204).

The first step of the process is to retrieve the Data Meta-Model (102) Root class (401) for the current package. A Root class is a class that is not contained or referenced by any other class in the meta-model; this class is seen as an entry point for editing according to a preferred embodiment. This sub-process is depicted on FIG. 5.

When finished, the Root-class lookup process (500) sends back a class definition to the current pages construction process (400). The class definition is then used to generate a page (402) using the class name as a basis for the page identifier and label. The process of page construction is described later with reference to FIG. 6. The process collects all the other classes contained in the package (403).

After step 403, the process loops on all the classes collected (404), then checks whether it is dealing with an interface (405). A class can implement interfaces which themselves define methods: an interface cannot be instantiated as the usual classes. Consequently, the interfaces must be filtered in the process because of not being edited. When it is determined that this is an interface (answer Yes to test 405), the next class is read (411). When it is determined that this is not an interface class (answer No to test 405), the system checks the hierarchy of the current class (406) in order to look for an abstract class (407) from within the package (408) in order to create a common page based on this abstract class (409). An abstract class represents an abstract concept and should not be instantiated. An abstract class as a parent class has children classes grouped under it. An abstract class may have attributes which are included in the children attributes. For limiting the number of pages, the editor will group the pages of all the classes under the same abstract class in one abstract class page. The Edit section of the abstract class page contains groups of attributes: one group of attributes of the abstract class common to the attributes of the children and a group of attributes for each child. If there is no abstract class (answer No to 407), the generation process creates a page (410) using the same construction and naming method as in steps 402 and 409, the steps for creating a page for one class being described later with reference to FIG. 6. During all the page creation steps the link between the class used and the page created is kept in memory by the generation process. The way the code keeps the link in memory during the generation process is not described herein as it is known by the person skilled in the art and is also programming language dependent. The generation process then checks the next class of the package collected in step 403. The pages creation process ends when there are no more classes to check.

It should be noted that the developer can modify the page in the generator at any step of the flowchart. More particularly, each time a page is created, that is in steps 402, 409, 410. At that stage the developer has access to the newly generated page code using a hook in the generation process where the code of the page can be modified to fit its needs. In a preferred embodiment the developer changes the code, other embodiments may use more sophisticated graphical user interfaces facilitating the implementation of the changes in the page by the developer.

It should also be noted that in the preferred embodiment the classes are supposed to be grouped by package. For instance, if the data meta-model is described using the UML language, an UML package contains a sub-model which itself may contain other packages. Also, in this embodiment, the function of grouping all the classes dependent on an abstract class under the same page (steps 406 to 409) of this abstract class is an optimization of the generated editor because it limits the number of pages in the generated editor. One other embodiment implementing one page per different class may be used and falls within the scope of the present invention.

Figure 5:
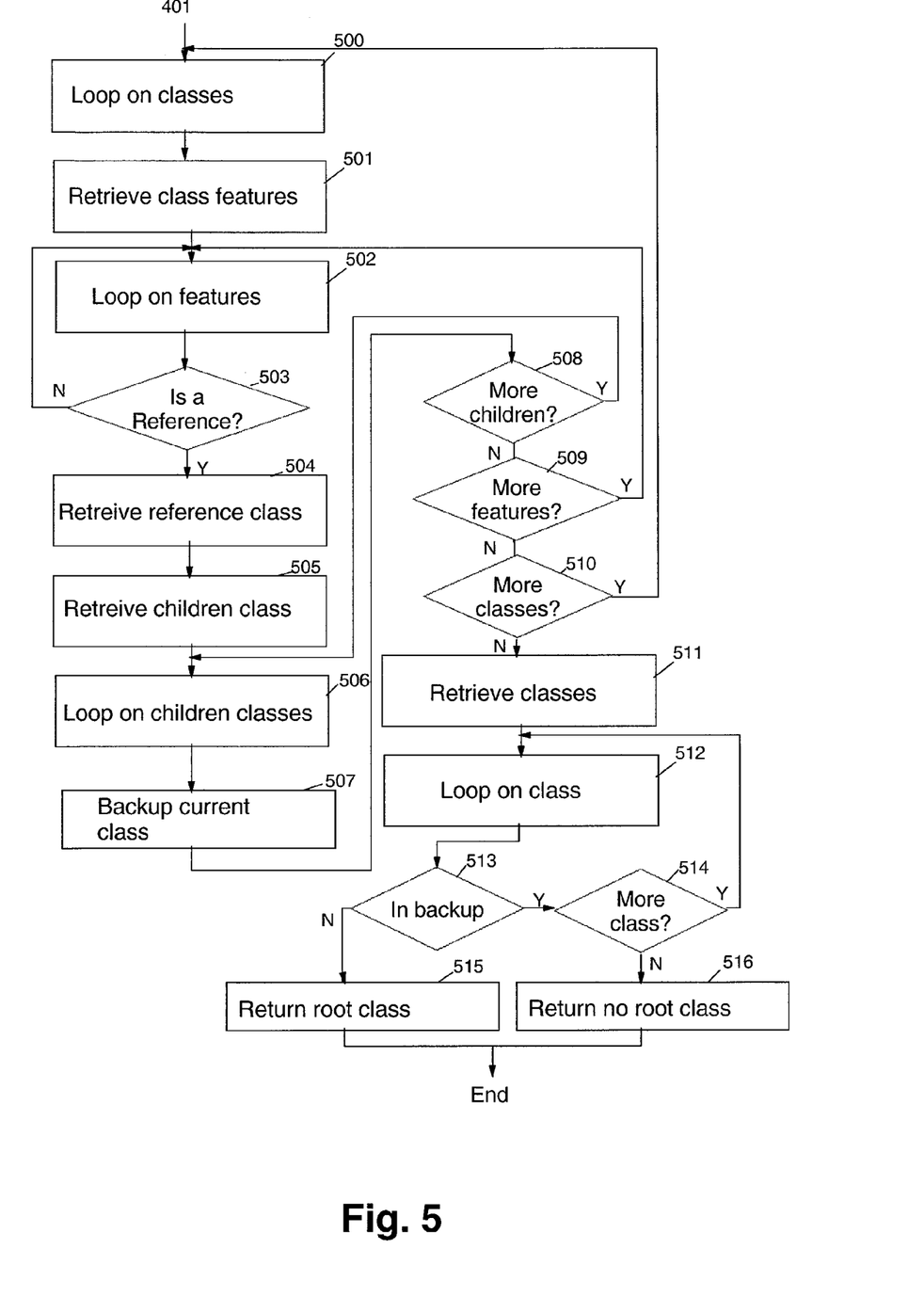
FIG. 5 is a flowchart of a method used to retrieve the data meta-model 'root class' during the generation process according to an embodiment of the invention.

FIG. 5 is a flowchart detailing the method used to retrieve the Root class (500) used in the Page Construction process (400) (in step 401) during the generation process of the editor components according to a sample embodiment of the present invention. This flowchart is implemented in the Class Visitor component (204).

The first step of the process is to collect all the pages (501) contained in the current UML package and do a loop on all of them (502). In the preferred embodiment the meta-model is described using the UML language and an UML package contains a sub-model which itself may contain other packages.

Using each class definition, the system gets the class features (503) based on the relations defined in the meta-model and loops on all of them (504) looking for a relation referencing another class (505). The referenced class (506) is then checked to get its children if any (507), itself otherwise.

During step 508, the system saves the current class (509) in a list. This list serves to keep in memory all the classes referenced by another one in the current package.

This process continues to loop on the classes until there is no child (510), no more relational features (511) and no more classes (512) in the package to analyze.

The second main part of process aims at comparing all the classes contained in the package with the list of references saved previously in step (509).

In order to find the Root class, the current process loops on all the classes (514) and checks the currently read class to see if it is present in the list. If so, the process continues until there are no more classes to read. When the process finds a class absent in the referenced list, the class is a Root class (step 515) and is sent back to the Page construction process (400). If no root class is retuned (step 516) by the process, the entire generation process can stop or ask the developer to select a class from the list of the classes contained in the package; this class acts then as the root class and is sent back to the Page construction process (400).

Figure 6:
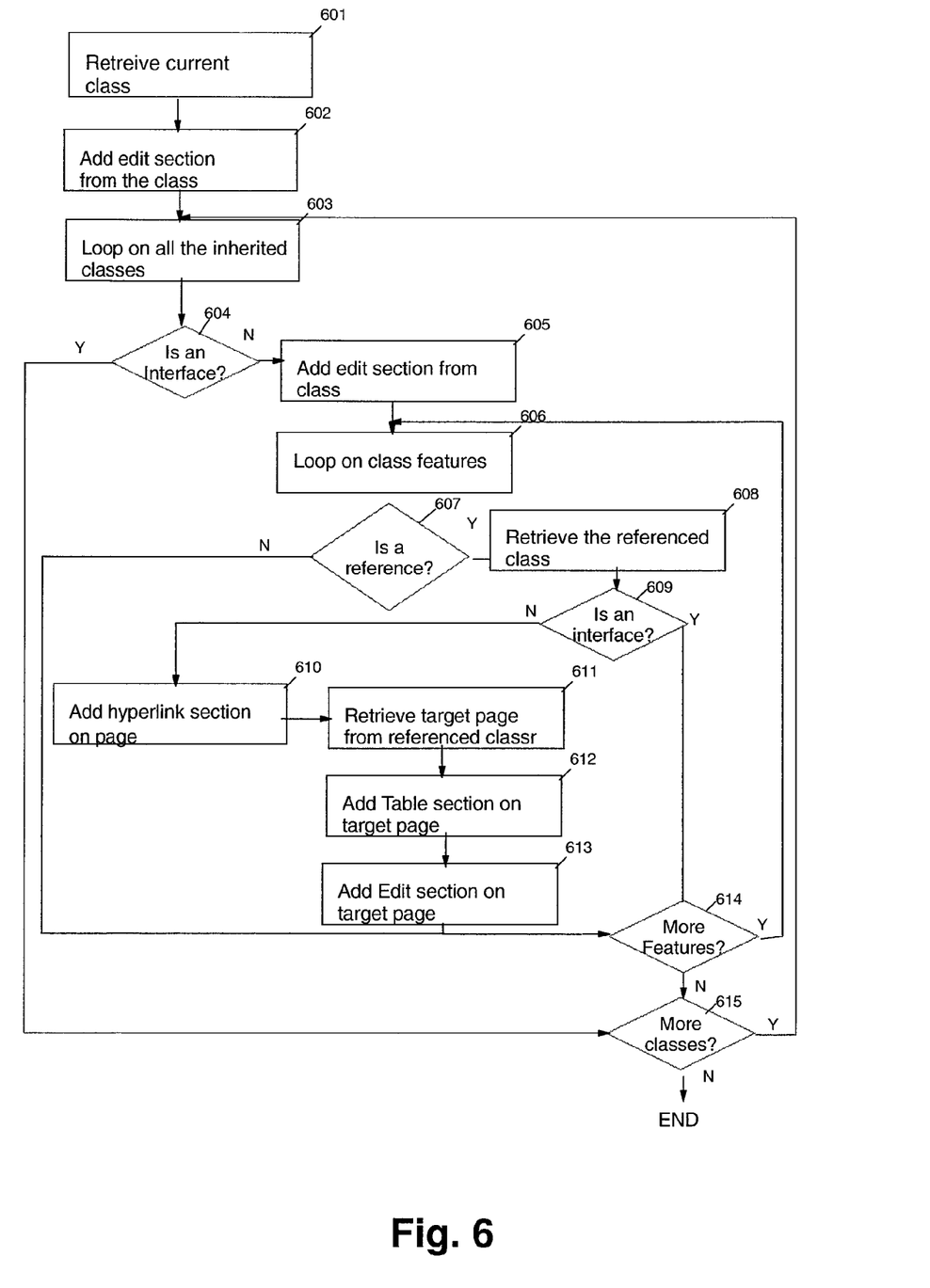
FIG. 6 is a flowchart of a method for creating a page comprising three types of sections according to an embodiment of the invention.

FIG. 6 is a general flowchart executed for creating a page for one class according to a sample embodiment of the invention. The steps listed in this flowchart are executed in the Pages construction process (402, 410) described in FIG. 4. Three types of sections are created in a page, the Edit Section (215), Hyperlink Section (213) and Table Section (214) in a preferred embodiment. This flowchart is implemented in the Relation Visitor component (206).

The first step (601) of the page creation uses the in-memory link between the pages and classes maintained during the Pages construction process to retrieve the current class which is associated with the page. The Edit Section is created and added to the current page in step 602.

An Edit Section contains edit fields based on the current class attributes and their types. When an Edit section is created, a sub process retrieves all the current class attributes and their types, creates and adds to the section for any one of them a label, followed by a graphical component based on the attribute type.

As an example of the association between an attribute type and a graphical component that will be displayed in the edit section, there are Check-boxes in case of a Boolean, Combo-box filled with a list of values for Enumerations (An Enumeration is a collection of named constants usually used to define a collection of unique elements such as days of the week or CPU types) and simple Text-edit for the other types. The illustrated associations provided herein serve as examples only and are subject to extensions or adaptations according to the context of implementation and they are not meant to limit the scope of the present invention.

From the current class, the process then loops on all the inherited classes (603) if any are found, filters the classes defined as interfaces: if the answer to test 604 is Yes, the next class is read (615); if the answer to test 604 is No the process creates an Edit Section for all the found ancestors and add it to the Edit section of the current page (605). This will give a view in the current page of the attributes of the current class that the current class has inherited from the ancestors. This improves the view of the user of the editor of the positioning of each class in the hierarchy of the data meta-model. This improvement (steps 603, 604, 605) is thus optional.

From the current class, the process reads all its features, keeps only the features which are references (607) and loops (606) on the references in order to retrieve the classes which are referenced (608). The process then filters the interfaces (609), creates a Hyperlink Section (213) with the list of pointers to all the class pages corresponding to the referenced classes and adds this section to the current page (610).

Using the referenced class to retrieve the target class of the relationship between the current class and the referenced class, the process creates a Table Section (214), gets the target page from the target class using the in-memory mapping and adds the newly created Table section to the target page (612). Finally, the process creates an Edit Section (215) for the target page, adds the section to the target page and if the language allows it, links the selected item in the table from the Table Section (214) to the current edition of the Edit Section (215).

The Sections construction process (600) ends when there are no more features and no more classes to work with.

Figure 7:
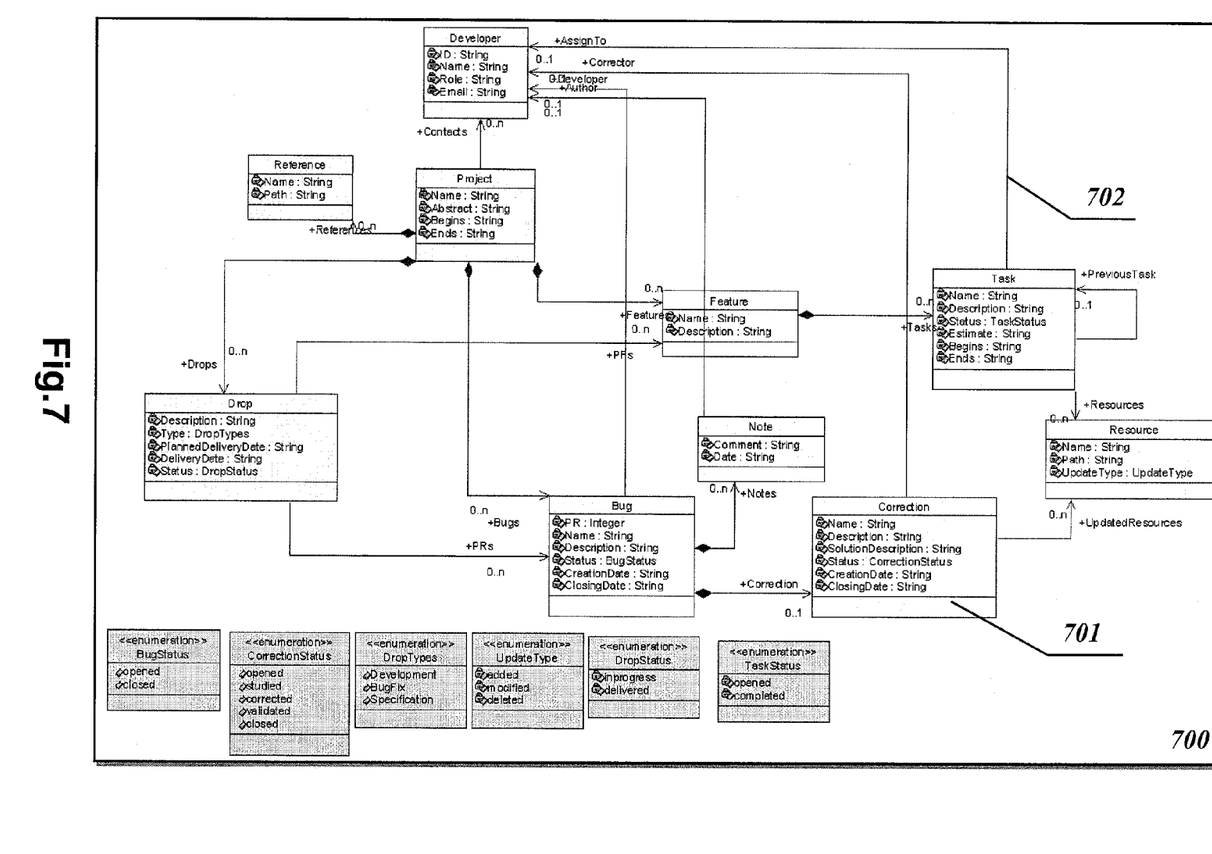
FIG. 7 illustrates an example of a data meta-model represented using the Unified Modeling Language (UML) used as input according to an embodiment of the invention.

FIG. 7 illustrates an example (700) of a Data meta-model represented using the UML language used as necessary input by the invention according to a preferred embodiment.

In FIG. 7 is represented an instance of a Data Meta-Model (102) as modeled by a program designer or architect using any high-level object-oriented modeling languages tooling with no graphical attributes defined, just Classes (701), classes attributes and their associated type (703) and the relations between classes (702). This class diagram example has been done using a modeling tool named Rational Rose®. Other representations of the data meta-model may be accomplished using any other high-level object-oriented modeling languages tooling.

It is noted that the classes, class attributes and relations between classes form the navigation tree which are read from the Data Meta-Model of FIG. 7 is the basis for the editing flow that the generator builds in the editor programs.

Figure 8:
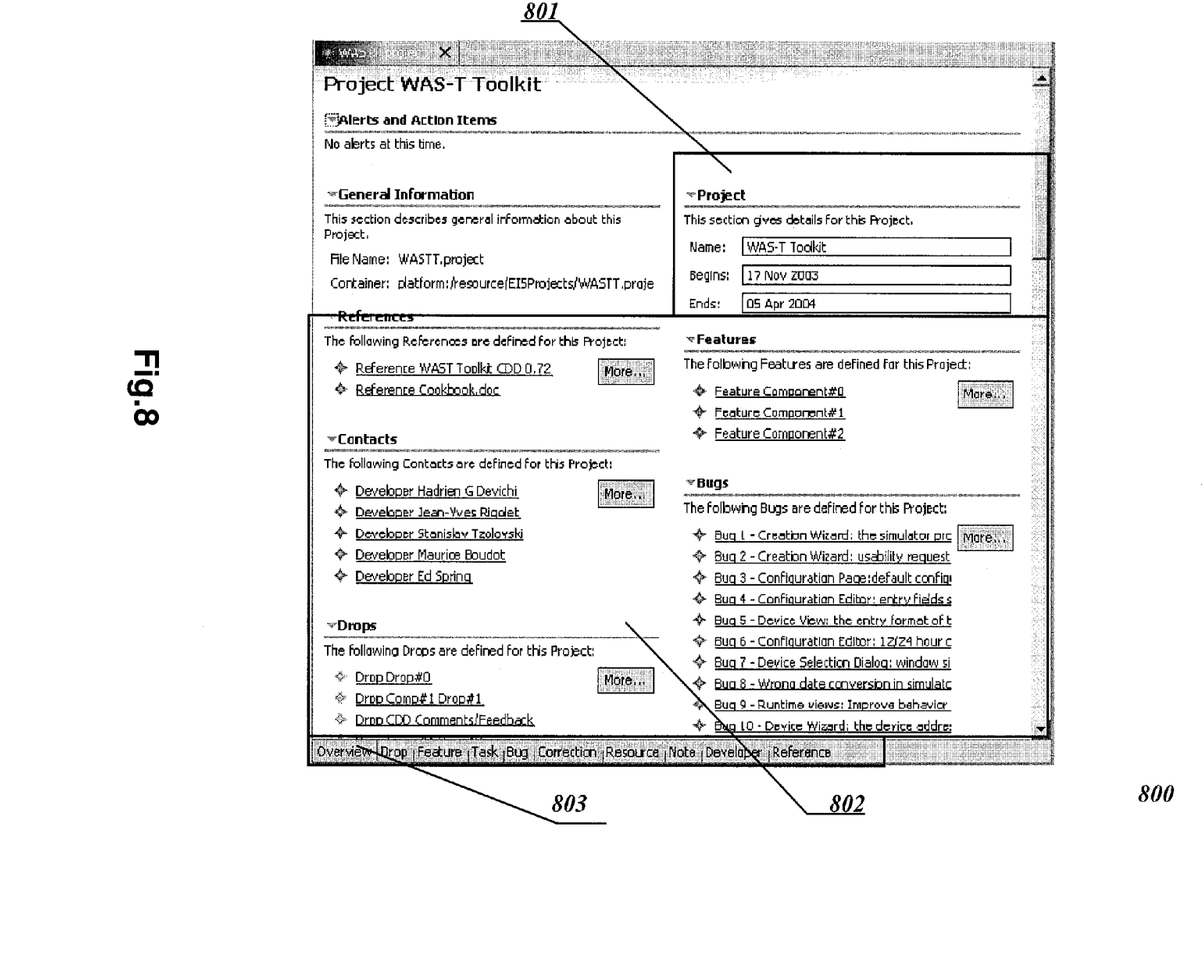
FIG. 8 illustrates an example of screen shot of an application data editor generated according to a preferred embodiment of the invention.

FIG. 8 illustrates an example of an application editor generated (800) according to a preferred embodiment using the FIG. 7 instance of data-meta-model (700) as the input of the editor generator (103), graphical libraries (104) provided by the development framework which is the Eclipse® framework in the preferred embodiment and a customization of the generator (106) to change the layout in order to display the contained hyperlink section (802) to the left of the page and on the external references to the right.

All the pages are available to be selected by the end-user using a notebook type of presentation (803). The first page displayed in the editor has been created based on the Root class (500) retrieved during the generation process, displays an edit section (801) containing all the project class attributes to be edited.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description but is not intended to exhaust or limit the invention in the form disclosed. Many modifications and variations will be apparent to those of ordinary skill in the art. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of generating an editor to be executed through a graphical user interface of a computer, for editing persistent data of an application, said persistent data being described and stored in a data object model using a modeling language defining a hierarchical organization of classes, class attributes and the relations between classes, said method comprising:
retrieving a root class by reading the data object model wherein the root class is an only class in the data object model which is not referenced by any other class;
starting from the root class, reading each class using the relations;
creating a page for editing all instances of said current class, for each read class, wherein said each read class is identified as a current class, and responsive to a determination that said each read class is not an interface;
storing a link between each current class and a corresponding created page;
creating, in each created page, a first section comprising fields for editing attributes of the current class, a second section for listing all instances of the current class when the instances will be edited and, using said stored link, creating a third section for displaying pointers towards class page instances of the classes referenced in said current class, wherein the first section, the second section and the third section are displayable.

2. The method of claim 1 wherein creating a page for each read class further comprises:
providing an editor user an option to change a graphical view of the created page during creation.

3. The method of claim 1 further comprising:
using said stored link for displaying a pointer to access the page of a class of the data object model.

4. The method of claim 1 wherein creating a third section for displaying pointers further comprises:
displaying tabs on a screen with a respective class name on each tab, wherein each tab directs a user towards the page of a corresponding class.

5. The method of claim 1 wherein creating a first section further comprises:
grouping fields for editing the attributes of the current class by all ancestor class attributes higher than the current class in the hierarchical organization of classes.

6. The method of claim 1 wherein creating a page further comprises:
determining whether there is an abstract class to which the current class is attached;
responsive to a determination that an abstract class is found, the abstract class becoming the current class; and
creating the first section comprises grouping fields for editing the attributes of the abstract class and attributes of all children classes.

7. A computer program product comprising programming code instructions stored in computer readable non-transitory storage media, said computer instructions when loaded on a computer system performing a method of generating an editor to be executed through a graphical user interface of a computer, for editing persistent data of an application, said persistent data being described and stored in a data object model using a modeling language defining a hierarchical organization of classes, class attributes and relations between the classes, said computer instructions comprising:
computer executable instructions for retrieving a root class by reading the data object model wherein the root class is an only class in the data object model which is not referenced by any other class;
computer executable instructions for starting from the root class, for reading each class using the relations;
computer executable instructions for creating a page for editing all instances of a current class for each read class, wherein said each read class is identified as said current class, and responsive to a determination that said each read class is not an interface;
computer executable instructions for storing a link between each current class and a corresponding created page;
computer executable instructions for creating, in each created page, a first section comprising fields for editing attributes of the current class, a second section for listing all instances of the current class when the instances will be edited and, using said stored link, creating a third section for displaying pointers towards class page instances of the classes referenced in said current class, wherein the first section, the second section and the third section are displayable.

8. A system comprising means adapted for generating an editor to be executed through a graphical user interface of a computer, for editing persistent data of an application, said persistent data being described and stored in a data object model using a modeling language defining a hierarchical organization of classes, class attributes and relations between classes, said system comprising:
a computer processor;
a memory coupled to the computer processor;
computer instructions stored on said memory, wherein the computer processor executes the computer instructions stored on said memory to direct the system to:
retrieve a root class by reading the data object model wherein the root class is an only class in the data object model which is not referenced by any other class;
read, starting from the root class, each class using the relations;
create a page for editing all instances of a current class for each read class, wherein said each read class is identified as said current class, and responsive to a determination that said each read class is not an interface;
store a link between each current class and a corresponding created page; and
create in each created page, a first section comprising fields for editing attributes of the current class, a second section for listing all instances of the current class when the instances will be edited and, using said stored link, creating a third section for displaying pointers towards class page instances of the classes referenced in said current class, wherein the first section, the second section and the third section are displayable.

* * * * *